United States Patent [19]

Cheesman et al.

[11] Patent Number: 5,501,793
[45] Date of Patent: Mar. 26, 1996

[54] TRAVELING WATER SCREEN INCLUDING IMPROVED BASKET

[75] Inventors: Robert R. Cheesman, Waukesha; James A. Ehleiter, Franklin; Don N. Gass, Brown Deer; Gary B. Tatsak, Glendale, all of Wis.; R. Ian Fletcher, Damariscotta, Me.

[73] Assignee: Envirex Inc., Waukesha, Wis.

[21] Appl. No.: 221,368

[22] Filed: Mar. 31, 1994

[51] Int. Cl.⁶ .................................................. B01D 33/333
[52] U.S. Cl. ........................ 210/160; 210/400; 210/499
[58] Field of Search .................... 210/155, 160, 210/158, 330, 400, 499

[56] References Cited

U.S. PATENT DOCUMENTS

| | | | |
|---|---|---|---|
| 1,781,223 | 11/1930 | Gary | 210/160 |
| 1,910,860 | 5/1933 | Sayers | 210/160 |
| 2,428,757 | 10/1947 | Lind | 210/400 |
| 2,765,923 | 10/1956 | Novak | 210/499 |
| 3,684,091 | 8/1972 | Wehner | 209/403 |
| 3,850,804 | 11/1974 | Taylor et al. | 210/155 |
| 3,868,324 | 2/1975 | Taylor et al. | 210/158 |
| 3,900,628 | 8/1975 | Stewart | 428/134 |
| 4,199,456 | 4/1980 | Cheesman | 210/232 |
| 4,302,331 | 11/1981 | Condit, Jr. | 210/160 |
| 4,360,426 | 11/1982 | Wetzel | 210/160 |
| 4,443,126 | 4/1984 | Strow et al. | 403/24 |
| 4,541,930 | 9/1985 | Heidler et al. | 210/344 |
| 4,582,601 | 4/1986 | Strow et al. | 210/161 |
| 4,634,535 | 1/1987 | Lott | 210/780 |
| 4,935,131 | 6/1990 | Pindar | 210/160 |
| 5,015,383 | 5/1991 | Evans et al. | 210/497.1 |
| 5,242,583 | 9/1993 | Thomas | 210/161 |
| 5,326,460 | 7/1994 | Cheesman et al. | 210/160 |

FOREIGN PATENT DOCUMENTS

| | | |
|---|---|---|
| 612987 | 5/1935 | Germany . |
| 923570 | 4/1982 | U.S.S.R. . |
| 319068 | 9/1929 | United Kingdom . |

OTHER PUBLICATIONS

The Failure and Rehabilitation of a Fish–Conserving Device; Transactions of the American Fisheries Society 121:678–679 (1992).

*Primary Examiner*—Christopher Upton
*Attorney, Agent, or Firm*—Michael, Best & Friedrich

[57] ABSTRACT

A traveling water screen including a basket having an upper lip beam and a lower lip beam, the lower lip beam including an elongated upwardly opening channel upstream of the water screen, the lower lip beam including an upstream wall having a lower portion the lower portion including a lower forward surface facing in the upstream direction, at least a portion of the lower forward surface being convex, and the upper portion of the upstream wall having a spoiler shape for deflecting water upwardly and over the upwardly opening channel. The traveling water screen also includes seals between adjacent baskets to prevent unscreened water from flowing through spaces between the baskets.

35 Claims, 1 Drawing Sheet

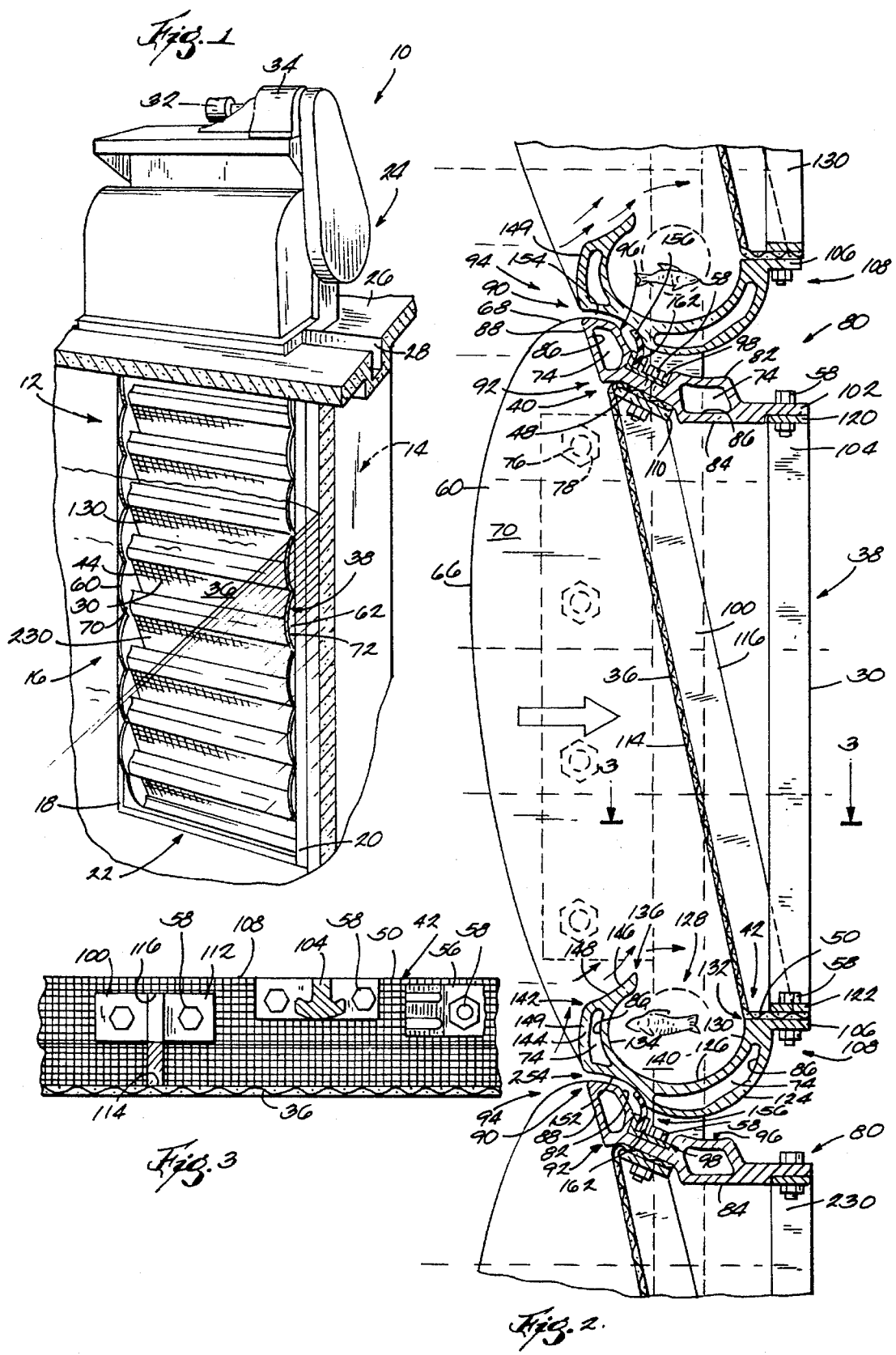

5,501,793

TRAVELING WATER SCREEN INCLUDING IMPROVED BASKET

BACKGROUND OF THE INVENTION

1. Field of the Invention

The invention relates to traveling water screens for screening debris and fish from water, and more particularly to an improved basket for a traveling water screen.

2. Reference to Prior Art

Traveling water screens have been used for many years in applications in which it is desired to screen debris and fish from large volumes of water. A typical application is in an industrial facility or power plant which requires a large volume of cooling water. Ordinarily, water for this purpose is taken from a river or lake through an inlet water channel. Debris and fish enter the channel with the water flowing into channel and must be screened out of the water to prevent debris from clogging the condenser tubes and to prevent the fish from being killed by heat and impingement on the condenser tubes and other parts of the cooling system.

U.S. Pat. Nos. 4,582,601, 4,360,426 and 3,868,324 illustrate traveling water screens. As shown therein, a traveling water screen typically includes an upright frame having a pair of spaced vertical support members. The support members are mounted adjacent the opposed sides of the water inlet channel, such that water flowing through the channel cannot flow around the sides of the water screen. The frame includes a boot portion adjacent the bottom of the channel and a head portion anchored in a horizontal shelf above the water in the channel. A foot shaft is supported for rotation at the boot portion. A head shaft is supported for rotation at the head portion of the frame, and a drive motor is connected to the head shaft. A pair of endless chains are trained around sprockets mounted on the head and foot shafts. A plurality of screen baskets are mounted on the chains and arranged in a continuous train for movement with the chains about a circuitous vertical path defined around the head and foot shafts. Adjacent baskets are mounted in close edge-to-edge relationship, and small gaps are provided between the baskets to provide clearance for the baskets to travel around the head and foot shafts. On the upstream side of the frame, the train of baskets moves upwardly from the foot shaft toward the head shaft, thereby forming a substantially continuous upwardly moving screen on the upstream side of the frame. The gaps between adjacent baskets permit unscreened water to flow through the traveling water screen.

Each basket includes spaced apart upper and lower lip beams, a pair of spaced apart end plates at opposite ends of the lip beams, and a water screen extending between the end plates and the upper and lower lip beams. The lower lip beam can include an elongated, upwardly opening channel upstream of the water screen for recovering fish trapped against the screen. The fish are captured in the channel as the basket moves upwardly on the upstream side of the frame. When the basket moves around the head portion of the frame, the fish and water are dumped out of the channel and into a trough in the shelf for return to the river or lake away from the water intake channel. A portion of the recovered fish are killed or injured before being deposited into the return trough.

SUMMARY OF THE INVENTION

The invention provides a traveling water screen including baskets configured for recovering live and uninjured fish.

The invention also provides a basket having a lower lip beam including an elongated upwardly opening channel for recovering fish, the lower lip beam having an upstream wall shaped to deflect water upwardly and over the channel and thereby generate substantially quiescent conditions in the lower region of the channel.

The invention also provides a traveling water screen including means for sealing between adjacent baskets to prevent unscreened water from flowing through gaps between the baskets.

More particularly, the invention provides a basket for a traveling water screen. The basket includes a frame and a water screen. In one embodiment, the frame is constructed from corrosion resistant fiberglass composite material. The frame includes upper and lower lip beams, and a pair of end plates at the opposite ends of the lip beams. The water screen extends between the lip beams and end plates. The lower lip beam includes an elongated, upwardly opening channel upstream of the water screen. The basket also includes means for generating substantially quiescent conditions in the lower region of the channel, this means including an upstream wall of the lower lip beam. The upstream wall includes a convex lower forward surface facing in the upstream direction. The upstream wall also includes an upper portion which extends upwardly and rearwardly from the lower forward surface, and which has a spoiler shape including a concave upper forward surface and an upper edge portion above the level of the lower edge portion of the water screen, for deflecting water upwardly and over the channel.

The invention also provides a traveling water screen including means for sealing between adjacent baskets to prevent unscreened water from flowing through gaps between the baskets. In one embodiment of the invention, the sealing means is an elongated resilient blade. The resilient blade is mounted on the upper lip beam of each basket and resiliently engages in sealing relation the lower lip beam of an adjacent basket to prevent water from flowing through the space between the baskets.

Other features and advantages of the invention will become apparent to those skilled in the art upon review of the following detailed description, claims and drawings.

BRIEF DESCRIPTION OF THE DRAWINGS

FIG. 1 is a perspective view of a traveling water screen embodying the invention.

FIG. 2 is an enlarged cross section elevation of a basket and portions of first and second adjacent baskets on the upstream side of the traveling water screen shown in FIG. 1.

FIG. 3 is a partial sectional view taken generally along line 3—3 in FIG. 2, showing forward and rear struts and the water screen supported on the lower lip beam.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is a traveling water screen 10 for screening debris from water flowing in a downstream direction through a water inlet channel. For purposes of description, the downstream direction is also referred to herein as "rearward", and the opposite or upstream direction is also referred to as "forward". Except for the construction of the baskets described herein, the traveling water screen 10 is similar to the traveling water screen disclosed in U.S. Pat. No. 4,582,601, which is assigned to the assignee hereof and is incorporated herein by reference.

The traveling water screen 10 includes an upright or vertical frame 12. The frame 12 has a downstream side 14 facing in the downstream direction and an opposed upstream side 16 facing in the upstream direction. The frame 12 includes a pair of spaced, parallel vertical support members 18 and 20. The frame 12 also has a boot portion 22 adjacent the bottom of the channel and a head portion 24 above the level of the water (not shown) in the channel. The traveling water screen 10 also includes a horizontally extending shelf 26 at the head portion 24 of the frame 12. The shelf 26 includes a fish return trough 28 extending away from the traveling water screen 10 for returning fish to a body of water, such as a river or lake, away from the water inlet channel. The traveling water screen 10 also includes a head shaft (not shown) supported at the head portion 24 of the frame 12 for rotation about a horizontal axis. A pair of head sprockets (not shown) are mounted in spaced relation on the head shaft. The traveling water screen 10 also includes a foot shaft (not shown) supported at the boot portion 22 of the frame 12 for rotation about a horizontal axis. A pair of foot sprockets (not shown) are mounted in spaced relation on the foot shaft. A pair of continuous chains (not shown) are trained around the head and foot sprockets. The traveling water screen 10 also includes a plurality of baskets 30 mounted on the chains and arranged in close edge-to-edge relation in a continuous train around the head and foot sprockets. The baskets 30 are supported by the chains for movement about a circuitous path defined around the head and foot shafts. The traveling water screen 10 also includes means for moving the train of baskets 30 about the path around the head and foot shafts. The means for moving the train of baskets 30 includes a drive motor 32 operably connected to a gear reducer 34, the gear reducer 34 having a drive sprocket (not shown) mounted thereon. The drive sprocket is operably connected by a drive chain (not shown) to a driven sprocket (not shown) mounted on the head shaft. The drive motor 32 thus connected rotates the head shaft and thereby moves the chains and the train of baskets 30 about the circuitous path defined around the head and foot shafts. The baskets 30 move downwardly from the head shaft toward the foot shaft on the downstream side 14 of the frame 12. As seen in FIGS. 1 and 2, the baskets 30 move upwardly from the foot shaft toward the head shaft and thereby form a substantially continuous upwardly moving screen on the upstream side 16 of the frame 12.

As best shown in FIG. 2, each basket 30 is mounted on the chains in close edge-to-edge relationship to upper and lower adjacent baskets 130 and 230. Each basket 30 includes a water screen mesh or water screen 36 mounted in a generally rectangular frame 38. The water screen 36 is rectangularly shaped and includes opposed upper and lower edge portions 40 and 42 and opposed end edge portions 44 (one shown in FIG. 1). The upper and lower edge portions 40 and 42 include respective elongated flanges 48 and 50. The end edge portions 44 also include respective flanges (not shown). The flanges are clamped against the frame 38 by spaced clamps 56 (one partially shown in FIG. 3). Each clamp 56 is fixed to the frame 38 by a bolt 58. Thus, the upper and lower edge portions 40 and 42 and end edge portions 44 are supported by the frame 38. As best shown in FIG. 2, the water screen 36 is inclined forwardly from the lower lip beam 108 to the upper lip beam 80.

Although the frame 38 can be constructed of other suitable materials, in the illustrated embodiment the frame 38 is constructed of composite fiberglass material. The frame 38 includes opposed end members or plates 60 and 62. The end plates 60 and 62 are mirror images of each other, and only the end plate 60 will be described in detail. The end plate 60 includes a straight rear edge portion (not shown), an arcuate front edge portion 66 spaced from the rear edge portion, an arcuate upper end portion 68 connecting the rear and front edge portions, and an arcuate lower end portion (not shown) opposite the upper end portion 68. The end plate 60 also includes opposed inner and outer surfaces 70 and 72. Four plugs or projections 74 extend inwardly from the inner surface 70. Two of the projections 74 are received in hollow cores in the upper lip beam 80, and two of the projections 74 are received in hollow cores in the lower lip beam 108, for connecting the end plate 60 to the upper and lower lip beams. The end plate 60 also includes four spaced apertures 76 for receiving bolts 78 connecting the end plate 60 to a respective one of the chains. Thus, the basket 30 is mounted on the chains. The end plate 60 also includes apertures extending between the inner and outer surfaces 70 and 74 for receiving bolts for securing clamps 56 to the end plate 60 to clamp the end edge portion flange against the end plate 60. Thus, the end edge portions 44 are supported by the end plates 60 and 62.

The frame 38 includes an elongated upper lip beam 80 (see FIG. 2) extending between the end plates 60 and 62. The upper lip beam 80 includes an outer surface 82 and an inner surface 84 opposite from the outer surface 82. Two hollow cores 86 are defined between the outer and inner surfaces 82 and 84. An end plate projection 74 is received in each end of each hollow core 86. The projections 74 received in the hollow cores 86 join the end plates 60 and 62 to the upper lip beam 80. The outer surface 82 includes an elongated forward surface 88. The forward surface 88 faces in the upstream direction and includes upper and lower forward edge portions 90 and 92. The forward surface 88 aligns or mates with the upstream wall of the lower lip beam 108 of the upper adjacent basket 130 to define a generally uniform, convex water deflection surface. The inner surface 84 extends rearwardly from the lower forward edge portion 92. The outer surface 82 includes an upper portion 96 extending rearwardly from the upper forward edge portion 90. The upper portion 96 includes an elongated slot 98. A plurality of longitudinally spaced apertures are drilled between the outer and inner surfaces 82 and 84 in the slot 98, for receiving bolts 58. Bolts 58 retain the clamps 56 (not shown) against the water screen flange 48 to clamp the water screen upper edge portion 40 against the inner surface 84 of the upper lip beam 80. Thus, the upper lip beam 80 supports the upper edge portion 40 of the water screen 36. Bolts 58 extend through apertures in front struts 100 to connect the front struts 100 to the upper lip beam 80. The inner surface 84 and the upper portion 96 of the outer surface 82 are joined at a rear edge portion 102. A plurality of longitudinally spaced apertures (not shown) are drilled between the outer surface 82 and the inner surface 84 in the rear edge portion 102, for receiving bolts 58. Bolts 58 extend through apertures in rear struts 104 to connect the rear struts 104 to the upper lip beam 80.

The basket 30 includes a pair of spaced apart front struts 100 (one shown). The front struts 100 extend vertically and rearwardly from the inner surface 84 of the upper lip beam 80 to the rear edge portion of a lower lip beam 108 (described below). Each front strut 100 is an elongated, generally I-shaped member having a longitudinal axis. Each front strut 100 includes upper and lower flanges 110 (see FIG. 2) and 112 (see FIG. 3) perpendicular to the longitudinal axis. The upper and lower flanges 110 and 112 respectively abut the upper and lower lip beams 80 and 108. Each flange 110 and 112 has therein a pair of apertures (not shown) for receiving bolts 58 and thus connecting the front strut 100 to the upper and lower lip beams 80 and 108. The front struts 100 support the upper and lower lip beams 80 and 108 intermediate the end plates 60 and 62 and thus prevent the frame 38 from excessively twisting or bending. Each front strut 100 also includes an elongated front edge portion 114 and a rear edge portion 116 opposite the front edge portion 114. The front edge portion 114 abuts the water screen 36 between the upper and lower lip beams 80 and 108 and thus prevents excessive deflection of the water screen 36 in the downstream direction.

The basket 30 also includes a pair of rear struts 104 (one shown) spaced between the end plates 60 and 62. The rear struts 104 extend vertically between the rear edge portion 102 of the upper lip beam 80 and the rear edge portion 106 of the lower lip beam 108. Each rear strut 104 is an elongated, generally T-shaped member having a longitudinal axis. Each rear strut 104 includes upper and lower flanges 120 and 122 perpendicular to the longitudinal axis. The upper and lower flanges 120 and 122 respectively abut the upper and lower lip beams 80 and 108. Each flange 120 and 122 has therein a pair of apertures (not shown) for receiving bolts 58 and thus connecting the rear strut 104 to the respective upper or lower lip beam 80 or 108. The rear struts 104 support the upper and lower lip beams 80 and 108 intermediate the end plates 60 and 62 and thus prevent the frame 38 from excessively twisting or bending.

The elongated lower lip beam 108 extends between the end plates 60 and 62 and includes an outer surface 124 and an inner surface 126 opposite from the outer surface 124. Two hollow cores 86 are defined between the outer and inner surfaces 124 and 126. An end plate projection 74 is received in each end of each hollow core 86. The projections 74 received in the hollow cores 86 join the end plates 60 and 62 to the lower lip beam 108. The outer surface 124 and the inner surface 126 are joined at an elongated rear edge portion 106. A plurality of longitudinally spaced apertures are drilled between the outer surface 124 and the inner surface 126 in the rear edge portion 106, for receiving bolts 58. As best shown in FIG. 3, various of the bolts 58 retain clamps 56 against the water screen flange 50 to clamp the water screen lower edge portion 42 against the rear edge portion 106. Thus, the lower lip beam 108 supports the lower edge portion 42 of the water screen 36. Various of the bolts 58 extend through the apertures and aligned apertures in the front and rear struts 100 and 104 to connect the struts to the lower lip beam 108.

The inner surface 126 of the lower lip beam 108 is arcuately shaped and defines an elongated, upwardly opening channel 128 generally upstream of the lower edge portion 42 of the water screen 36. The inner surface 126 includes a rear portion 130 extending forwardly and downwardly from the rear edge portion 106, such that a channel rear edge 132 is defined at the intersection of the rear portion 130 and the rear edge portion 106. The inner surface 126 also includes a front portion 134 extending forwardly and upwardly from the rear portion 130 and terminating at an elongated front upper edge portion 136. The front upper edge portion 136 is spaced upstream or forward of the lower edge portion 42 of the water screen 36, such that an elongated channel opening is defined between the front upper edge portion 136 and the water screen 36. The front upper edge portion 136 is also spaced above the level of the channel rear edge 132 and the lower edge portion 42 of the water screen 36. Thus, the channel 128 has an upper region adjacent the channel opening and a lower region 140 below the upper region.

The basket 30 also includes means for generating substantially quiescent conditions in the bottom region 140 of the water in the channel 128. In the illustrated embodiment this means includes an upstream wall 142 on the lower lip beam 108. The upstream wall 142 is defined by the outer surface 124 and extends generally downwardly and forwardly from the front upper edge portion 136. The upstream wall 142 includes a lower portion 144 and an upper portion 146. The upper portion 146 includes a concave upper forward surface 148 facing in the upstream direction and terminating at the front upper edge portion 136. The upper forward surface 148 is inclined upwardly and rearwardly with respect to the direction of flow of water through the water screen 36, i.e., upwardly in the downstream direction. Thus, the upper portion 146 of the upstream wall 142 has a spoiler shape and is inclined upwardly and rearwardly for deflecting water upwardly and over the upwardly opening channel 128. The lower portion 144 of the upstream wall 142 includes a convex generally vertical lower forward surface 149 facing in the upstream direction and joining the upper forward surface 148. The lower forward surface 149 is aligned or mates with the forward surface 88 of the upper lip beam 80 of the lower adjacent basket 30 to define a generally uniform, convex water deflection surface 94. Water is deflected by the water deflection surface 94 upwardly toward the upper forward surface 148 and downwardly toward the water screen 36 of the lower adjacent basket 230. Thus, substantially quiescent conditions are generated in the bottom region 140 of the water in the channel 128.

The outer surface 124 also includes a concave lower surface portion 152 below the lower forward surface 149 of the upstream wall 142. The lower surface portion 152 is spaced slightly from and is adapted to house or nest with the outer surface 82 of the upper lip beam 80 of the lower adjacent basket 230. A narrow gap or space 254 is defined between the lower surface portion 152 and the outer surface 82 of the upper lip beam 80 of the lower adjacent basket 230. Another space 154 is defined between the outer surface 82 of the upper lip beam 80 of the basket 30 and the lower surface portion 152 of the upper adjacent basket 130. The spaces 154 and 254 provide clearance between the baskets 30, 103 and 230 for the baskets to pass around the head and foot shafts.

While the upper and lower lip beams could be constructed of other materials, in one preferred embodiment of the invention they are formed from pultruded fiberglass and are manufactured by Bedford Reinforced Plastics (Bedford, Pa.).

The basket 30 also includes means 156 for sealing between the basket 30 and adjacent baskets 130 and 230 to prevent unscreened water from flowing through the traveling water screen 10 between the baskets 30, 130 and 230. Although other suitable sealing means can be used, in the illustrated embodiment the sealing means 156 is an elongated resilient blade. The resilient blade 156 can be constructed of any suitable resilient material, such as 80 shore A durometer neoprene or ethylene propylene. The resilient blade 156 includes an inner edge portion and an outer edge portion opposite from the inner edge portion. The inner edge portion of the blade 156 is mounted in an elongated F-shaped bracket 162. The bracket 162 is mounted in the slot 98 in the outer surface 82 of the upper lip beam 80 by bolts 58. Thus, the resilient blade 156 is mounted on the upper lip beam 80 of the basket 30. The outer edge portion of the blade 156 resiliently engages the lower lip beam 108 of the upper adjacent basket 130 to prevent water from flowing through the space 154 between the upper lip beam 80 of the basket 30 and the lower lip beam 108 of the upper adjacent basket 130. A resilient blade 156 is mounted on the upper lip beam 80 of each of the baskets 30 and each resiliently engages the lower lip beam 108 of a respective adjacent basket to prevent water from flowing between the baskets. The resilient blade 156 can be supported by one of the upper or lower lip beams 80 or 108 of each basket 30 to resiliently engage the other of the upper or lower lip beam 80 or 108 of a respective adjacent basket and thus prevent unscreened water from flowing through the traveling water screen 10 between the baskets.

In operation, the train of baskets 30 moves upwardly on the upstream side 16 of the frame 12. Water flows in the downstream direction through the water screens 36 of the upwardly moving baskets 30, such that debris and fish are screened out of the water by the water screens 36. The upper and lower lip beams 80 and 108 of the baskets 30 are spaced slightly from the respective upper and lower lip beams 80 and 108 of the upper and lower adjacent baskets 130 and 230 to provide clearance for the baskets 30 to pass around the head and foot shafts. The resilient blade 156 mounted on the upper lip beam 80 of each basket 30 resiliently engages the lower lip beam 108 of a respective upper adjacent basket 30 to prevent water from flowing through the traveling water screen 10 between the baskets 30.

As each basket 30 moves upwardly, fish caught against the water screen 36 are captured in the upwardly opening channel 128 of the lower lip beam 108. The upstream wall 142 of the lower lip beam 108 generates substantially quiescent conditions in the bottom region 140 of the water in the channel 128, so that the fish in the channel 128 are not excessively tossed about and thus injured or killed. The upper portion 146 of the upstream wall 142 has a spoiler shape and is inclined upwardly and rearwardly, and thus deflects water upwardly and over the upwardly opening channel 128. The lower portion 144 of the upstream wall 142 includes a convex lower forward surface 149 which mates with the forward surface 88 of the upper lip beam 80 of the lower adjacent basket 30 to define a convex water deflection surface 94. Water is deflected by the water deflection surface 94 upwardly toward the upper forward surface 148 and downwardly toward the water screen 36 of the lower adjacent basket 30. Thus, water flowing in the downstream direction is deflected away from the channel 128, and substantially quiescent conditions exist in the lower region 140 of the water in the channel 128. As the basket 30 moves around the head portion 24 of the frame 12, the fish slide out of the channel 128, across the water screen 36, across the upper lip beam 80, and are dumped out of the upturned basket 30 and into the fish return trough 28 in uninjured condition. The fish are thus returned to the body of water through the fish return trough 28 in live and uninjured condition.

What is claimed is:

1. A basket for a traveling water screen, the traveling water screen being operable for screening water flowing through the traveling water screen in a downstream direction, the basket comprising an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the lower lip beam including an upstream wall having a lower portion and an upper portion, the lower portion of the upstream wall including a lower forward surface facing in the upstream direction, at least a portion of the lower forward surface being convex, the upper portion of the upstream wall being inclined upwardly and in the downstream direction from the lower portion of the upstream wall, the upper portion of the upstream wall including an upper forward surface facing in the upstream direction, and at least a portion of the upper forward surface being nonplanar for deflecting water upwardly and over the upwardly opening channel.

2. A basket as set forth in claim 1 wherein the upper forward surface is concave.

3. A basket as set forth in claim 1 wherein the upper portion of the front wall of the lower lip beam includes an upper edge, said upper edge being above the level of at least a portion of the water screen.

4. A basket as set forth in claim 1 wherein the lower lip beam includes a concave lower surface portion below the upstream wall, the lower surface portion housing a portion of an upper lip beam of an adjacent basket.

5. A basket as set forth in claim 4 wherein the lower surface portion of the lower lip beam nests with the portion of the upper lip beam of the adjacent basket.

6. A basket as set forth in claim 5 wherein a narrow channel is defined between the lower surface portion and the upper lip beam of the adjacent basket, the channel having a width which increases in the downstream direction to permit debris entering the channel to pass through the channel.

7. A basket as set forth in claim 1 wherein said upper lip beam includes a forward surface facing in the upstream direction and which mates with an upstream wall of a lower lip beam of an adjacent basket to define a generally uniform water deflection surface.

8. A basket as set forth in claim 7 wherein the water deflection surface has a generally uniform convex shape.

9. A basket as set forth in claim 1 and further comprising a resilient blade supported by one of the lower lip beam of the basket and an upper lip beam of an adjacent basket, the blade resiliently engaging the other of the lower lip beam of the basket and the upper lip beam of the adjacent basket to prevent water from flowing therebetween.

10. A basket for a traveling water screen, the traveling water screen being operable for screening water flowing through the traveling water screen in a downstream direction, the basket comprising an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the channel containing water having an upper region adjacent the opening and a bottom region below the upper region, the lower lip beam including means for generating a substantially quiescent condition in the bottom region of the water in the channel, and the lower lip beam having a smooth, arcuate inner surface for flushing fish from the channel when the basket is moved to an inverted position.

11. A traveling water screen, the traveling water screen being operable for screening water flowing through the traveling water screen in a downstream direction, comprising a vertical frame, a plurality of baskets trained around the frame for vertical movement about a circuitous path, and means for moving the train of baskets about the circuitous path, each of the baskets including an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the lower lip beam including an upstream wall having a lower portion and an upper portion, the lower portion of the upstream wall including a lower forward surface facing in the upstream direction, at least a portion of the lower forward surface being convex, the upper portion of the upstream wall being inclined upwardly and in the downstream direction from the lower portion of the upstream wall, the upper portion of the upstream wall including an upper forward surface facing in the upstream direction, and at least a portion of the upper forward surface being nonplanar for deflecting water upwardly and over the upwardly opening channel.

12. A basket as set forth in claim 11 wherein the upper forward surface is concave.

13. A traveling water screen as set forth in claim 11 wherein the upper portion of the front wall of the lower lip beam includes an upper edge, said upper edge being above the level of at least a portion of the water screen.

14. A basket as set forth in claim 11 wherein the lower lip beam includes a concave lower surface portion below the upstream wall, the lower surface portion housing a portion of an upper lip beam of an adjacent basket.

15. A basket as set forth in claim 14 wherein the lower surface portion of the lower lip beam nests with the portion of the upper lip beam of the adjacent basket.

16. A basket as set forth in claim 15 wherein a narrow channel is defined between the lower surface portion and the upper lip beam of the adjacent basket, the channel having a width which increases in the downstream direction to permit debris entering the channel to pass through the channel.

17. A traveling water screen as set forth in claim 11 wherein said upper lip beam includes a forward surface facing in the upstream direction and which mates with an upstream wall of a lower lip beam of an adjacent basket to define a generally uniform water deflection surface.

18. A traveling water screen as set forth in claim 17 wherein the water deflection surface has a generally uniform convex shape.

19. A traveling water screen as set forth in claim 11 and further comprising a resilient blade supported by one of the lower lip beam of the basket and an upper lip beam of an adjacent basket, the blade resiliently engaging the other of the lower lip beam of the basket and the upper lip beam of the adjacent basket to prevent water from flowing therebetween.

20. A traveling water screen, the traveling water screen being operable for screening water flowing through the traveling water screen in a downstream direction, comprising a vertical frame, a plurality of baskets trained around the frame for vertical movement about a circuitous path, each of said baskets being arranged in close edge-to-edge relationship with adjacent baskets such that spaces are defined between said basket and adjacent baskets, means for moving the train of baskets about the circuitous path, and means for sealing between said baskets and adjacent baskets to prevent unscreened water from flowing through said spaces between said baskets, said means for sealing engaging one of said basket and one of said adjacent baskets to form a water resistant seal, said means for sealing being configured such that water flowing through the traveling water screen exerts pressure on said means for sealing which improves the integrity of the water resistant seal.

21. The traveling water screen as set forth in claim 20, wherein each of said baskets and adjacent baskets includes spaced apart upper and lower lip beams, and said sealing means includes means for sealing between said upper and lower lip beams of said basket and said adjacent baskets.

22. The traveling water screen as set forth in claim 21, wherein said sealing means is a resilient blade mounted on one of said upper and lower lip beams of each of said baskets, said resilient blade resiliently engaging in sealing relation one of said upper and lower lip beams of an adjacent basket and thus forming a water resistant seal with said one of said upper and lower lip beams of an adjacent basket, and said resilient blade being mounted in an orientation such that water flowing through the traveling water screen exerts pressure on said resilient blade which improves the integrity of the water resistant seal.

23. A traveling water screen, the traveling water screen being operable for screening water flowing through the traveling water screen in a downstream direction, comprising a vertical frame, a plurality of baskets trained around the frame for vertical movement about a circuitous path, and means for moving the train of baskets about the circuitous path, each of the baskets including an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the channel containing water having an upper region adjacent the opening and a bottom region below the upper region, the lower lip beam including means for generating a substantially quiescent condition in the bottom region of the water in the channel, and the lower lip beam having a smooth, arcuate inner surface for flushing fish from the channel when the basket is moved to an inverted position.

24. A basket for a traveling water screen, the traveling water screen being operable for screening water flowing through the traveling water screen in a downstream direction, the basket comprising an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an inner wall defining an upwardly opening channel upstream of the water screen, the lower lip beam including an upstream wall spaced from the inner wall, the upstream wall having a lower portion and an upper portion, the lower portion of the upstream wall including a lower forward surface facing in the upstream direction, at least a portion of the lower forward surface being convex, the lower lip beam being integrally constructed of a composite nonmetallic material, and the lower portion and the upper portion of the upstream wall being integrally formed, and the upper portion of the upstream wall including an upper forward surface facing in the upstream direction, and at least a portion of the upper forward surface being nonplanar for deflecting water upwardly and over the upwardly opening channel.

25. The basket as set forth in claim 24, wherein the lower lip beam is formed by pultrusion.

26. The basket as set forth in claim 24, wherein the upper forward surface is concave.

27. The basket as set forth in claim 24, wherein the lower portion of the upstream wall is integral with the upper portion of the upstream wall.

28. The basket as set forth in claim 24, wherein the inner wall defines a smooth, arcuate inner surface for flushing fish from the channel when the basket is moved to an inverted position.

29. A traveling water screen, the traveling water screen being operable for screening water flowing through the traveling water screen in a downstream direction, comprising a vertical frame, a plurality of baskets trained around the frame for vertical movement about a circuitous path, and means for moving the train of baskets about the circuitous path, each of the baskets including an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an inner wall defining an upwardly opening channel upstream of the water screen, the lower lip beam including an upstream wall spaced from the inner wall, the upstream wall having a lower portion and an upper portion, the lower portion of the upstream wall including a lower forward surface facing in the upstream direction, at least a portion of the lower forward surface being convex, the lower lip beam being integrally constructed of a composite nonmetallic material, and the lower portion and the upper portion of the upstream wall being integrally formed, and the upper portion of the upstream wall including an upper forward surface facing in the upstream direction, and at least a portion of the upper forward surface being nonplanar for deflecting water upwardly and over the upwardly opening channel.

30. The traveling water screen as set forth in claim 29, wherein the lower lip beam is formed by pultrusion.

31. The traveling water screen as set forth in claim 29, wherein the upper forward surface is concave.

32. The traveling water screen as set forth in claim 29, wherein the lower and upper portions of the upstream wall are integral.

33. The traveling water screen as set forth in claim 29, wherein the inner wall defines a smooth, arcuate inner surface for flushing fish from the channel when the basket is moved to an inverted position.

34. A basket for a traveling water screen, the traveling water screen being operable for screening water flowing through the traveling water screen in a downstream direction, the basket comprising an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the lower lip beam including an upstream wall having a lower portion and an upper portion, the lower portion of the upstream wall including a lower forward surface facing in the upstream direction, at least a portion of the lower forward surface being convex, the upper portion of the upstream wall being inclined upwardly and in the downstream direction from the lower portion of the upstream wall, the upper portion of the upstream wall including an upper forward surface facing in the upstream direction, and the upper forward surface being concave for deflecting water upwardly and over the upwardly opening channel.

35. A traveling water screen, the traveling water screen being operable for screening water flowing through the traveling water screen in a downstream direction, comprising a vertical frame, a plurality of baskets trained around the frame for vertical movement about a circuitous path, and means for moving the train of baskets about the circuitous path, each of the baskets including an upper lip beam, a pair of spaced apart end members at opposite ends of the upper lip beam and joined to the upper lip beam, a water screen extending between the end members and having an upper edge portion supported by the upper lip beam, a lower edge portion opposite the upper edge portion, and opposite edges supported by the spaced apart end members, and a lower lip beam extending between the spaced apart end members and supporting the lower edge portion of the water screen, the lower lip beam including an elongated upwardly opening channel upstream of the water screen, the lower lip beam including an upstream wall having a lower portion and an upper portion, the lower portion of the upstream wall including a lower forward surface facing in the upstream direction, at least a portion of the lower forward surface being convex, the upper portion of the upstream wall having a spoiler shape and including a concave upper forward surface facing in the upstream direction for deflecting water upwardly and over the upwardly opening channel.

* * * * *